US012643347B2

(12) United States Patent
Speziari et al.

(10) Patent No.: US 12,643,347 B2
(45) Date of Patent: Jun. 2, 2026

(54) TYRE FOR VEHICLE WHEELS

(71) Applicant: PIRELLI TYRE S.P.A., Milan (IT)

(72) Inventors: Diego Ettore Speziari, Milan (IT);
Giovanni Casarotto, Milan (IT)

(73) Assignee: PIRELLI TYRE S.P.A., Milan (IT)

( * ) Notice: Subject to any disclaimer, the term of this
patent is extended or adjusted under 35
U.S.C. 154(b) by 63 days.

(21) Appl. No.: 18/715,362

(22) PCT Filed: Dec. 22, 2022

(86) PCT No.: PCT/IB2022/062658
§ 371 (c)(1),
(2) Date: May 31, 2024

(87) PCT Pub. No.: WO2023/126790
PCT Pub. Date: Jul. 6, 2023

(65) Prior Publication Data
US 2025/0153512 A1     May 15, 2025

(30) Foreign Application Priority Data
Dec. 27, 2021     (IT) ........................ 102021000032687

(51) Int. Cl.
*B60C 11/03*     (2006.01)
*B60C 11/12*     (2006.01)
*B60C 11/13*     (2006.01)
(52) U.S. Cl.
CPC ...... *B60C 11/0304* (2013.01); *B60C 11/0318*
(2013.01); *B60C 11/033* (2013.01);
(Continued)
(58) Field of Classification Search
CPC ............... B60C 11/0304; B60C 11/033; B60C
11/1392; B60C 11/1236; B60C 11/0318
See application file for complete search history.

(56) References Cited

U.S. PATENT DOCUMENTS

| | | | | | |
|---|---|---|---|---|---|
| D780,106 | S | * | 2/2017 | Zhao | D12/568 |
| D847,727 | S | * | 5/2019 | McGee | D12/532 |

(Continued)

FOREIGN PATENT DOCUMENTS

| | | |
|---|---|---|
| EP | 2077193 A1 | 7/2009 |
| EP | 2436536 A1 | 4/2012 |

(Continued)

OTHER PUBLICATIONS

International Search Report and Written Opinion for International
Application No. PCT/IB2022/062658 filed Dec. 22, 2022 on behalf
of Pirelli Tyre S.P.A. Mailed on Feb. 23, 2023. 14 pages.

*Primary Examiner* — Steven D Maki
(74) *Attorney, Agent, or Firm* — Steinfl + Bruno LLP

(57)     ABSTRACT

A tyre for vehicle wheels includes a tread band having a first
annular portion delimited by two circumferential channels.
The first annular portion includes two annular grooves
extending along respective zig-zag paths. Each of the two
annular grooves is defined by a plurality of first parts
inclined on one side with respect to a reference plane
orthogonal to an equatorial plane of the tyre and by a
plurality of second parts inclined with respect to the refer-
ence plane on the opposite side to the first parts. Each of the
second parts is circumferentially interposed between two
respective first parts. Each of the first parts is connected to
a respective circumferential channel by a respective first
transversal groove arranged at an intermediate portion of the
first part and by a respective second transversal groove
arranged at an end of the first part.

26 Claims, 4 Drawing Sheets

(52) U.S. Cl.
CPC ...... *B60C 11/1204* (2013.01); *B60C 11/1236*
(2013.01); *B60C 11/1392* (2013.01); *B60C*
*2011/0346* (2013.01); *B60C 2011/0372*
(2013.01); *B60C 2011/1213* (2013.01); *B60C*
*2011/1231* (2013.01)

(56)                 References Cited

U.S. PATENT DOCUMENTS

| | | | | | |
|---|---|---|---|---|---|
| D869,385 | S | * | 12/2019 | Lamb | D12/594 |
| D879,025 | S | * | 3/2020 | Kochanek | D12/587 |
| 2003/0094226 | A1 | | 5/2003 | Colombo et al. | |
| 2009/0107601 | A1 | | 4/2009 | Niknam et al. | |

FOREIGN PATENT DOCUMENTS

| | | | |
|---|---|---|---|
| JP | 2001001722 | A | 1/2001 |
| JP | 2002059710 | A | 2/2002 |
| JP | 2008105615 | A | 5/2008 |

* cited by examiner

TYRE FOR VEHICLE WHEELS

CROSS-REFERENCE TO RELATED APPLICATIONS

The present application is the U.S. National Stage of International Patent Application No. PCT/IB2022/062658 filed on Dec. 22, 2022, which, in turn, claims priority to Italian Patent Application No. 102021000032687 filed on Dec. 27, 2021.

The present invention relates to a tyre for vehicle wheels.

The tyre of the invention is preferably a tyre intended to be used on low-grip road surfaces, in particular on icy and possibly snow-covered roads.

Preferably, such a tyre is intended to be used in high and ultra-high performance vehicles.

Tyres for high and ultra-high performance vehicles, commonly defined as "HP" or "UHP" tyres, are in particular those that allow speeds of over 190 km/h, up to more than 300 km/h, to be reached. Examples of such tyres are those having speed codes "T", "U", "H", "V", "Z", "W", "Y", according to the E.T.R.T.O. standard. (European Tyre and Rim Technical Organisation). Typically, such tyres have a width of radial section equal to or greater than 185 mm, preferably comprised between 195 mm and 385 mm, more preferably comprised between 195 mm and 355 mm, and are mounted on rims having fitting diameters equal to or greater than 13 inches, preferably not greater than 24 inches, more preferably comprised between 16 inches and 23 inches.

Throughout the present description and in the following claims, when reference is made to certain values of certain angles, these values are deemed to be absolute values, i.e. both positive values and negative values with respect to a reference plane or direction, unless specified otherwise.

Moreover, when reference is made to any range of values comprised between a minimum value and a maximum value, the aforementioned minimum and maximum values are deemed to be included in the aforementioned range, unless expressly stated to the contrary.

Moreover, all of the ranges include any combination of the described minimum and maximum values and include any intermediate range, even if not specifically expressly described.

Even if not expressly indicated, any numerical value is deemed to be preceded by the term "about" to also indicate any numerical value that differs slightly from that described, for example to take into account the dimensional tolerances typical of the field of reference.

Hereinafter, the following definitions apply.

The term "elastomeric material" is used to indicate a material comprising a vulcanizable natural or synthetic polymer and a reinforcing filler, wherein such a material, at room temperature and after having been subjected to vulcanization, can have deformations caused by a force and is capable of quickly and energetically recovering the substantially original shape and size after the elimination of the deforming force (according to the definitions of standard ASTM D1566-11 Standard Terminology Relating To Rubber).

The term "equatorial plane" of the tyre is used to indicate a center plane perpendicular to the rotation axis of the tyre.

The terms "radial" and "axial" and the expressions "radially inner/outer" and "axially inner/outer" are used to refer to a direction substantially parallel to the equatorial plane of the tyre and to a direction substantially perpendicular to the equatorial plane of the tyre, respectively, i.e. to a direction substantially perpendicular to the rotation axis of the tyre and to a direction substantially parallel to the rotation axis of the tyre, respectively.

The term "parallel" is used to indicate not only a condition of perfect parallelism, but also a condition diverging from the perfectly parallelism, for example by an angle not greater than 5°.

The term "perpendicular" referred to the equatorial plane of the tyre is used to indicate an inclination with respect to the equatorial plane by any angle comprised between 85° and 95°.

The terms "circumferential" and "circumferentially" are used to refer to the direction of circumferential extension of the tyre, i.e. to the rolling direction of the tyre, which corresponds to a direction lying on a plane coinciding with or substantially parallel to the equatorial plane of the tyre.

The term "transversal" is used to refer to a direction oriented, with respect to a plane orthogonal to the equatorial plane, according to an acute angle not greater than 45°.

The term "maximum width of radial section", or "maximum cord", is used to indicate the maximum width of the profile of the tyre, i.e. the dimension of the segment having as ends the two axially outermost points of the profile of the tread band.

The tread pattern is defined by all the blocks, the circumferential channels/grooves, the transversal channels/grooves provided on the tread band.

The depth of the tread band is measured along a direction perpendicular to the rotation axis of the tyre, thus along a radial direction.

The term "channel" is used to indicate a recess formed on the tread band and having a width greater than, or equal to, 5 mm. More preferably, the channel has a depth greater than, or equal to, 6 mm.

The term "groove" is used to indicate a recess formed on the tread band and having a width lower than that of a channel and greater than 2 mm. More preferably, the groove has a depth lower than or equal to that of a channel.

The term "sipe" is used to indicate a recess formed on the tread band and having a width lower than, or equal to, 2 mm.

The term "block" is used to indicate a portion of tread band delimited by channels or grooves and not by sipes. In the case in which the block is positioned on the axially outermost portion of the tread band, it is delimited in the axial direction on one side by the axially outermost face of the tread band and, on the other side, by a channel or groove.

The term "annular groove" is used to indicate a groove that extends along a circular path. Such a path can be defined by many parts inclined to one another, like for example parts that extend along a circumferential direction and parts that extend along a transversal direction.

The term "width" of a channel, or of a groove, or of a sipe, or of an annular portion of tread band, is used to indicate a dimension measured along a direction orthogonal to the direction along which the channel, the groove, the sipe or the annular portion of tread band (or a part thereof) extends. For example, the width of a circumferential channel is measured along a direction orthogonal to the circumferential direction, whereas the width of a transversal groove is measured along a direction orthogonal to the transversal direction.

The term "circumferential length" is used to indicate a dimension measured along a direction lying on, or parallel to, the equatorial plane.

The term "circumferential extension" of the tyre, or of the tread band or of portions thereof, is used to indicate the extension in plan of the radially outermost surface of the tyre, or of the tread band or of portions thereof, on a plane tangent to the tyre.

The term "void/solid ratio" is used to indicate the ratio between the overall surface of the channels and of the grooves excluding the sipes, of a certain annular portion of the tread pattern of the tyre (possibly of the entire tread band or tread pattern) and the surface of said certain portion of tread pattern (possibly of the entire tread band or tread pattern).

The term "footprint" of the tyre is used to indicate the portion of tyre which is in contact with the ground or road surface when the tyre is mounted on a rim of a wheel and a predetermined vertical load is exerted on the tyre. In the case in which channels and/or grooves are provided on the tread band of the tyre, the footprint also includes such channels and/or grooves.

The term "pitch" referred to the tread band is used to indicate a portion of tread band that is repeated substantially equals to itself many times along the entire circumferential extension of the tyre. Pitches having different circumferential lengths can be provided in a tyre.

Tyres for icy and/or snow-covered road surfaces are described for example in JP 2001 001722A and EP 2436536. Such tyres comprise a tread band in which two circumferential channels are formed that define in the tread band a central region and two side regions arranged on opposite sides with respect to the central region. Each of the aforementioned regions comprises a plurality of blocks.

The Applicant has focused its attention on tyres intended to be mounted in high and ultra-high performance vehicles and to be used on road surfaces that are in low-grip conditions due to the presence of ice and possibly snow.

Such a type of tyre requires a high ability to grip to the icy and possibly snow-covered road surface, so as to be able to effectively discharge to the ground the high drive torque to which they are subjected and, therefore, achieve an effective traction and an effective braking.

The aforementioned tyres must also allow to achieve good performance in terms of drivability and directional stability on the icy and possibly snow-covered road.

The Applicant has observed that in order to allow the aforementioned tyres to offer the desired grip to the icy/snow-covered road surface it is advisable both to provide a footprint in which the mutual contact surface between tread band and ground is sufficiently large so as to increase the surface at which an effective transfer of the drive torque to the ground occurs during travel, and to distribute the contact pressures as evenly as possible inside the footprint, so as to tend towards the optimal travel condition, in which the same contact pressure acts in all of the areas in which the tread band is in contact with the road surface.

The Applicant has though that it is possible to increase the aforementioned contact surface and tend towards the desired even distribution of the contact pressures inside the footprint by providing the tread band with the capability of deforming sufficiently when a vertical load is applied.

The Applicant has also observed that in order to allow the aforementioned tyres to obtain good performance in terms of drivability and directional stability it is advisable for the tread band to have, at at least one annular portion thereof, a tread pattern that is regular both in the circumferential direction and in the axial direction.

The Applicant has also noted that each channel/groove defines in the tread band a hinge that, when a vertical load is applied, like the one acting on the footprint of the tyre during travel, allows the portions of tread band adjacent to such a channel/groove and that are at the footprint to deform by squashing against the road surface.

The Applicant has thus thought to a mutual arrangement of channels/grooves suitable for allowing the tread band to deform along many directions at the footprint.

The Applicant has perceived that in order to achieve such a purpose it is advantageous to provide at least two circumferential channels that delimit an annular portion of tread band in which a pair of annular grooves and a plurality of transversal grooves that connect each of the aforementioned circumferential channels to a respective annular groove are provided.

According to the Applicant, indeed, the multiple connection between each circumferential channel and a respective annular groove provides the aforementioned annular portion of tread band with a high capability of deforming under load along multiple directions, to the benefit of the grip drivability and directional stability.

The Applicant has observed that such a capability of deforming along multiple directions can be further increased by providing for each of the two annular grooves to extend along a respective zig-zag path and for at least some of the parts that define the respective zig-zag path to be connected to a respective circumferential channel through the aforementioned transversal grooves at both an intermediate portion and an end of such parts.

According to the Applicant, indeed, this specific positioning of the transversal grooves with respect to the parts of the annular grooves makes it possible to prevent the tread band from being sufficiently stiff at each of such parts, thus offering a certain resistance to deformation.

The Applicant has thus found that the provision in the tread band of at least one annular portion comprising a pair of circumferential channels, each of which is connected, through a plurality of transversal grooves, to intermediate areas and to ends of parts of a respective annular groove that extends along a zig-zag path, allows such an annular portion of tread band to deform along many directions at the footprint of the tyre, to the benefit of the grip, drivability and directional stability on icy and possibly snow-covered road surfaces.

The present invention relates to a tyre for vehicle wheels comprising a tread band having a first annular portion delimited by two circumferential channels.

Preferably, the first annular portion comprises two annular grooves.

Preferably, a first annular groove of said two annular grooves extends along a zig-zag path.

Preferably, a second annular groove of said two annular grooves extends along a zig-zag path.

Preferably, said first annular groove is defined by a plurality of first parts inclined on one side with respect to a reference plane orthogonal to an equatorial plane of said tyre.

Preferably, said second annular groove is defined by a plurality of first parts inclined on one side with respect to the aforementioned reference plane.

Preferably, the first parts of the first annular groove are inclined on the same side as the first parts of the second annular groove with respect to the aforementioned reference plane.

Preferably, said first annular groove is defined by a plurality of second parts inclined with respect to said reference plane on the opposite side to the first parts of said first annular groove.

Preferably, said second annular groove is defined by a plurality of second parts inclined with respect to said reference plane on the opposite side to the first parts of said second annular groove.

Preferably, the second parts of the first annular groove are inclined on the same side as the second parts of the second annular groove with respect to the aforementioned reference plane.

Preferably, each of said second parts is circumferentially interposed between two respective first parts.

Preferably, each of said first parts is connected to a respective circumferential channel of said two circumferential channels by a respective first transversal groove.

Preferably, said respective first transversal groove is arranged at an intermediate portion of the first part.

Preferably, each of the first parts of said two annular grooves is connected to the respective circumferential channel by a respective second transversal groove.

Preferably, said second transversal groove is arranged at an end of the first part.

The Applicant deems that a tread band made in accordance with what is described above, having an annular portion capable of deforming along many directions at the footprint, makes it possible to achieve the desired increase of the contact surface with the road surface at the footprint and the desired even distribution of the contact pressures inside the footprint, providing the tyre with excellent performances in terms of drivability and directional stability on icy and possibly snow-covered roads.

The present invention can comprise at least one of the preferred characteristics described hereinafter.

Preferably, said first parts are longer than said second parts.

Preferably, the first parts of each of said two annular grooves are parallel to one another.

Preferably, the first parts of each of said two annular grooves have equal length within a single pitch.

Preferably, the second parts of each of said two annular grooves are parallel to one another.

Preferably, the second parts of each of said two annular grooves have equal length within a single pitch.

Preferably, the first parts of a first annular groove of said two annular grooves are parallel to the first parts of a second annular groove of said two annular grooves.

Preferably, the second parts of said first annular groove are parallel to the second parts of said second annular groove.

Preferably, each second part of a first annular groove of said two annular grooves is aligned with a respective second part of a second annular groove of said two annular grooves.

Preferably, the first parts of each of said two annular grooves are orthogonal to the second parts of the respective annular groove.

The Applicant deems that each of the preferred characteristics recited above contributes to provide the aforementioned annular portion of tread band with a certain geometric regularity in the circumferential and transversal direction, with consequent benefits not only in terms of uniformity and constancy of performance during travel but also with respect to the noise caused by the rolling of the tyre.

Preferably, the second parts of each of said two annular grooves are connected to the respective second parts of the other of said two annular grooves through respective connecting grooves.

Such connecting grooves allow a mutual connection of the two annular grooves, and therefore of the two circumferential channels, actually increasing the tread band surface that is capable of deforming under load.

Preferably, said first annular portion comprises, between said two annular grooves, a circumferential row of blocks.

Preferably, said blocks have a quadrangular shape.

Preferably, each block of said circumferential row of blocks has a square shape.

Such a provision allows the blocks to have substantially identical behavior along two orthogonal directions, to the benefit of drivability and directional stability on any road surface.

Preferably, said circumferential row of blocks is defined in an axially central position with respect to said two annular grooves.

Preferably, each block of said circumferential row of blocks is delimited in part by a first part of the plurality of first parts of a first annular groove of said two annular grooves.

Preferably, each block of said circumferential row of blocks is delimited in part by a second part of the plurality of second parts of said first annular groove.

Preferably, each block of said circumferential row of blocks is delimited in part by one of said connecting grooves.

Preferably, each block of said circumferential row of blocks is delimited in part by a first part of the plurality of first parts of a second annular groove of said two annular grooves.

Preferably, each block of said circumferential row of blocks is delimited in part by a second part of the plurality of second parts of said second annular groove.

Preferably, each block of said circumferential row of blocks is delimited in part by another of said connecting grooves.

Preferably, said first transversal groove comprises two mutually inclined segments.

Preferably, said second transversal groove comprises two mutually inclined segments.

In this way, each annular groove is connected to the respective circumferential channel through a plurality of first transversal grooves and a plurality of second transversal grooves, each second transversal groove being circumferentially interposed between two respective first transversal grooves.

Preferably, the first annular portion comprises, at at least one of said two circumferential channels, a chamfered side edge.

The Applicant has noted that such a chamfering is advantageous in particular during travel on snow-covered roads, contributing to obtain the desired performance in terms of traction and braking and of longitudinal and transversal directional stability. Furthermore, since it is provided precisely at a circumferential channel, and thus in a high-yielding area of the tread band, it actually makes it possible to reduce such yielding (due to the reduction in depth of the tread band at the chamfering), contributing to make such yielding more even over the entire footprint.

Preferably, the equatorial plane intersects said first annular portion.

Preferably, said first annular portion is asymmetrical with respect to the equatorial plane.

Preferably, the tread band is asymmetrical with respect to the equatorial plane.

Preferably, a ratio between a width of said first annular portion and a maximum width of a radial section of the tyre is greater than, or equal to, 0.30.

The Applicant has found that such a provision makes it possible to improve the grip on icy road surfaces.

Preferably, the tread band has a void to solid ratio lower than or equal to 0.30.

The Applicant has found that such a provision also makes it possible to improve the grip on icy road surfaces.

Preferably, the tread band comprises a number of pitches greater than, or equal to, 56.

The Applicant has found that such a provision makes it possible to improve traction and braking, in particular on snow-covered road surfaces.

Preferably, the tread band has a tread pattern comprising a plurality of first pitches having a first circumferential length.

Preferably, the tread pattern further comprises a plurality of second pitches having a second circumferential length different from the first circumferential length.

Preferably, the tread pattern comprises a plurality of third pitches having a third circumferential length different from said first circumferential length.

Preferably, said third circumferential length is different from said second circumferential length.

The provision of at least two types of pitches of different length produces beneficial effects with respect to the rolling noise. By providing three types of pitches of different length such beneficial effects are increased. It is indeed possible in this way to properly alternate the various pitches along the circumferential extension of the tyre (for example through suitable frequency optimization software) and increase the difference in length between shorter pitch and longer pitch, in order to avoid generating undesirable repetitions of frequency that would result in an increase of the rolling noise.

Preferably, the tread band comprises a second annular portion delimited by a circumferential channel of said two circumferential channels.

Preferably, said second annular portion comprises a plurality of transversal grooves.

Preferably, the transversal grooves of said second annular portion are parallel to one another.

Preferably, said second annular portion comprises a circumferential row of blocks.

Preferably, the blocks of said second annular portion have a quadrangular shape.

Preferably, said second annular portion extends entirely on just one side with respect to the equatorial plane.

Preferably, said second annular portion is also delimited by a further circumferential channel.

Preferably, a ratio between a width of said second annular portion and a maximum width of a radial section of the tyre is greater than, or equal to, 0.15.

Preferably, the tread band has, at opposing annular shoulder portions thereof, a depth smaller than the depth at an axially central annular portion extending on opposite sides with respect to the equatorial plane.

Preferably, the tread band has, at a side annular portion axially interposed between said axially central annular portion and a respective annular shoulder portion, a depth smaller than the depth at said axially central annular portion.

Preferably, said depth is greater than the depth of said respective annular shoulder portion.

The profile of the tread band thus progressively tapers moving from the equatorial plane towards the opposite annular shoulder portions. Such tapering contributes to keep down the rolling noise.

Preferably, the tread band comprises a plurality of sipes. Such a provision makes it possible to achieve an excellent behavior on the snow, particularly with respect to traction and braking.

Further characteristics and advantages of the present invention will be more evident from the following description of preferred embodiments thereof made with reference to the appended drawings. In such drawings.

Figure 2:
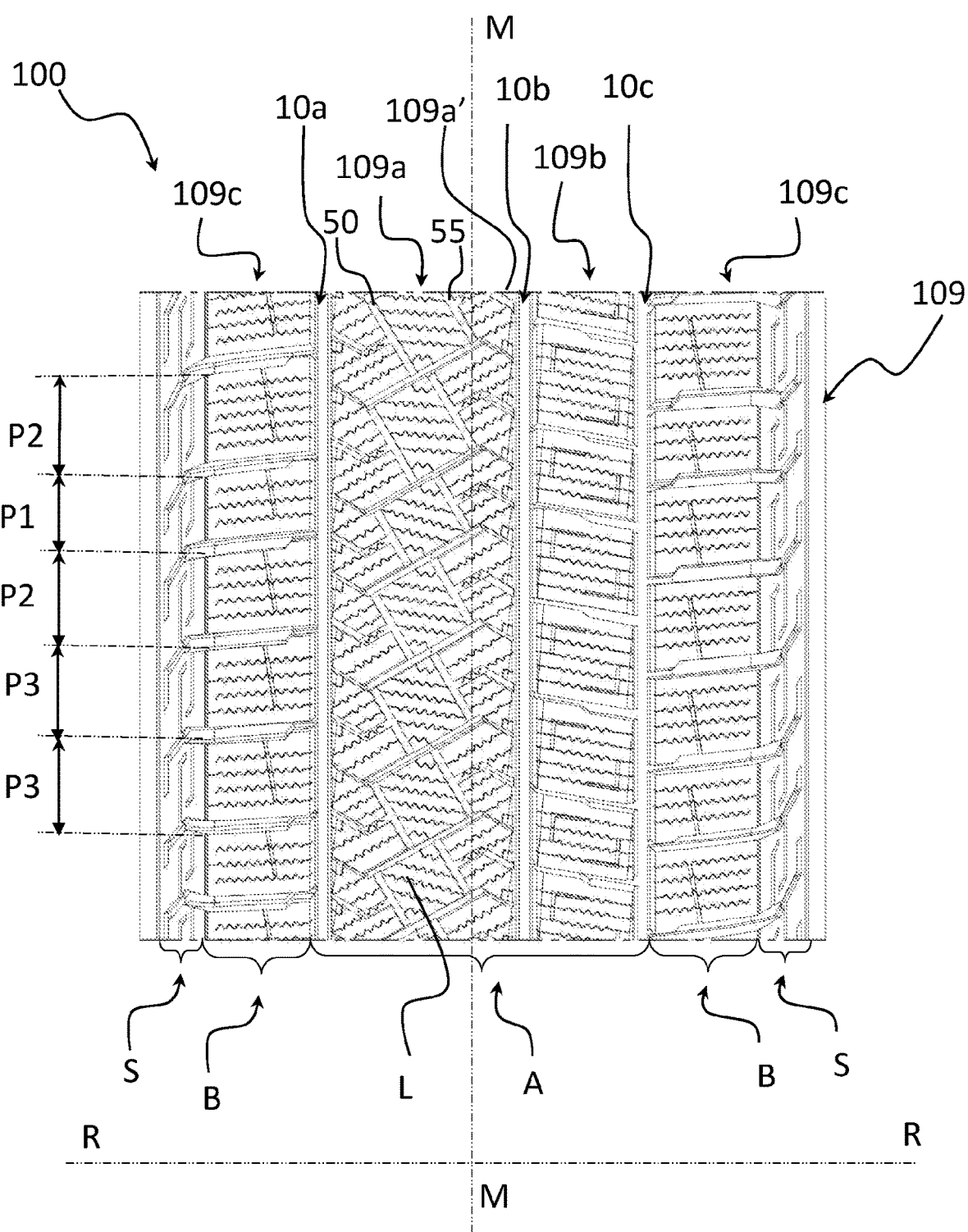
FIG. 2 is a front view of a portion of a tyre in accordance with the present invention, in which the tread pattern of such a tyre can be seen.
Figure 3:
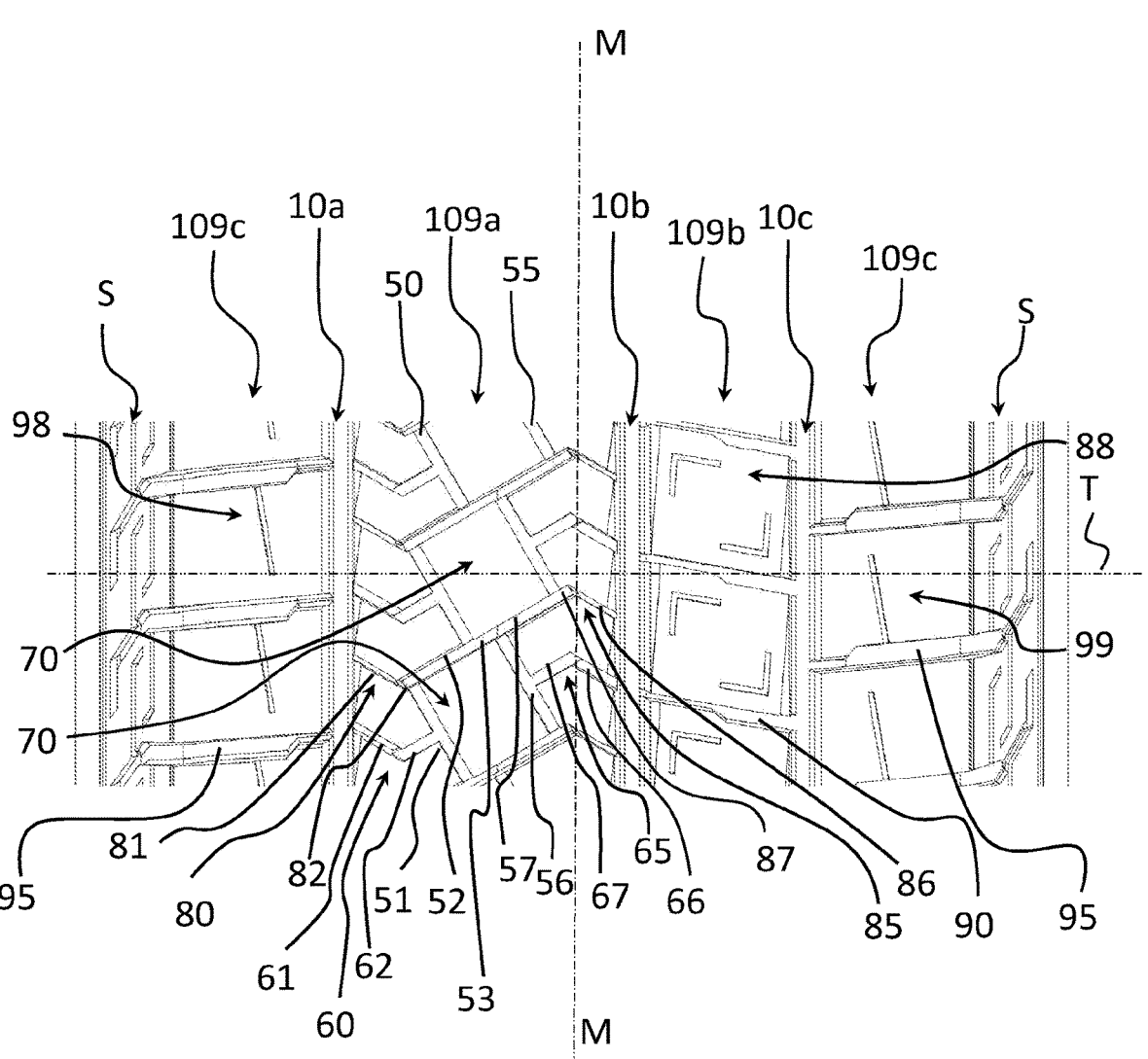
Figure 4:
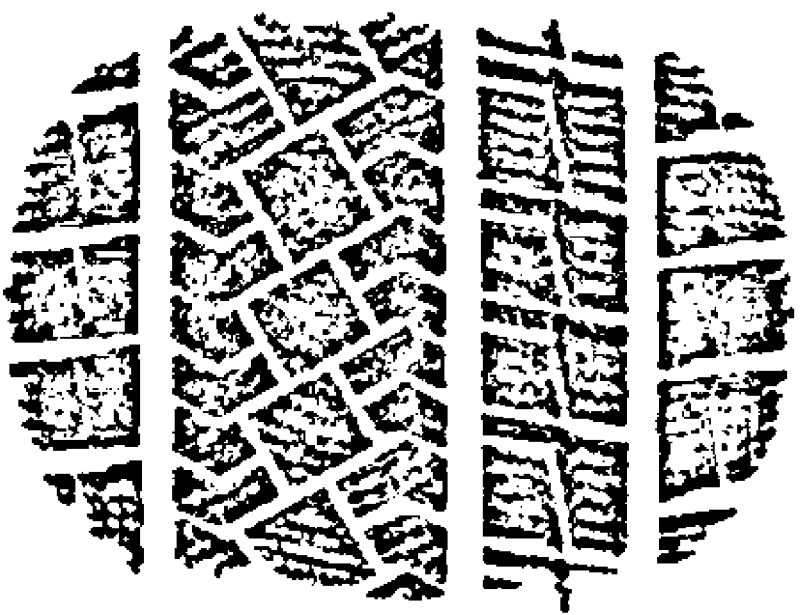

FIG. 3 schematically shows a portion of the tread pattern of FIG. 2, which for the sake of simplicity of illustration is shown without sipes;

FIG. 4 schematically shows the footprint of the tyre of FIG. 2.

Figure 1:
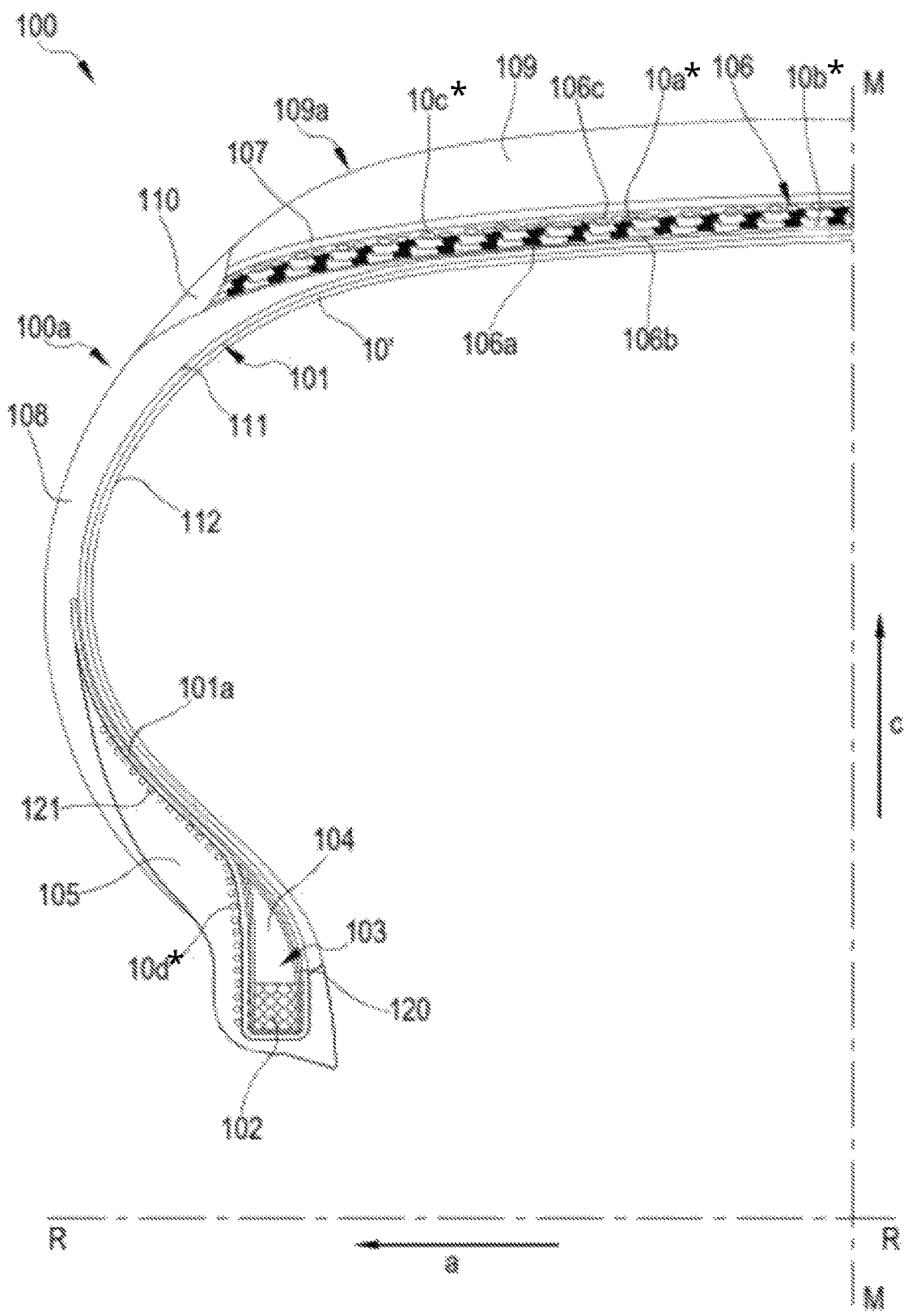
FIG. 1 is a schematic partial half-cross section view of a portion of the internal structure of a tyre in accordance with the present invention.

For the sake of simplicity, FIG. 1 shows the structure of only one side of an embodiment of a tyre 100 in accordance with the present invention. The structure of the remaining side not shown can be substantially identical to that of the side shown in FIG. 1, except for possible structural differences that have no impact on the present invention.

The tyre 100 shown in FIG. 1 is, in particular, an HP or UHP tyre for sports and/or high or ultra-high performance vehicles and is intended to be used on low-grip road surfaces, in particular on icy and possibly snow-covered road surfaces.

In FIG. 1 "a" indicates an axial direction, "c" indicates a radial direction, "M-M" indicates the equatorial plane of the tyre 100 and "R-R" indicates the rotation axis of the tyre 100.

The tyre 100 comprises at least one support structure 100a and, in a radially outer position with respect to the support structure 100a, a tread band 109 made of elastomeric material.

The support structure 100a comprises a carcass structure 101 which in turn comprises at least one carcass ply 111.

Hereinafter, for the sake of simplicity of presentation, reference will be made to an embodiment of the tyre 100 comprising a single carcass ply 111. It is nevertheless understood that what is described has analogous application in tyres comprising more than one carcass ply.

The carcass ply 111 has axially opposite end edges engaged with respective annular anchoring structures 102, called bead cores, possibly associated with an elastomeric filler 104. The area of the tyre 100 comprising the bead core 102 and the possible elastomeric filler 104 forms an annular reinforcing structure 103 called "bead structure" and configured to allow the anchoring of the tyre 100 on a corresponding mounting rim, not shown.

The carcass ply 111 comprises a plurality of reinforcing cords 10' coated with an elastomeric material or incorporated in a matrix of cross-linked elastomeric material.

The carcass structure 101 is of the radial type, i.e. the reinforcing cords 10' are arranged on planes comprising the rotation axis R-R of the tyre 100 and substantially perpendicular to the equatorial plane M-M of the tyre 100. In radial tyres having two or more carcass plies, the respective reinforcing cords have an angle different from 90° with respect to the equatorial plane M-M, for example 84°-88°, and therefore they do not lie on planes comprising the rotation axis.

Each annular reinforcing structure 103 is associated with the carcass structure 101 by folding back (or turning) the opposite end edges of the at least one carcass ply 111 around the bead core 102 and the possible elastomeric filler 104, so as to form the so-called turns 101a of the carcass structure 101.

An anti-abrasion strip 105 is arranged at each annular reinforcing structure 103 so as to wrap the annular reinforcing structure 103 along the axially inner, axially outer and radially inner areas of the annular reinforcing structure 103, thus being arranged between the latter and the rim of the wheel when the tyre 100 is mounted on the rim. Such an anti-abrasion strip 105 may however not be provided.

The support structure 100a comprises, in a radially outer position with respect to the carcass structure 101, a crossed belt structure 106 comprising at least two belt layers 106a, 106b arranged in radial juxtaposition with respect to one another.

The belt layers 106a, 106b respectively comprise a plurality of reinforcing cords 10a*, 10b*. Such reinforcing cords 10a*, 10b* have an orientation which is inclined with respect to the circumferential direction of the tyre 100, or to the equatorial plane M-M of the tyre 100, by an angle comprised between 15° and 45°, preferably between 20° and 40°. For example, such an angle is equal to 30°.

The reinforcing cords 10a*, 10b* of a belt layer 106a, 106b are parallel to each other and have a crossed orientation with respect to the reinforcing cords of the other belt layer 106b, 106a.

The support structure 100a comprises, in radially outer position with respect to the crossed belt structure 106, at least one zero degrees reinforcing layer 106c, commonly known as "zero degrees belt". It comprises reinforcing cords 10c* oriented in a substantially circumferential direction. Such reinforcing cords 10c* thus form an angle of a few degrees (typically lower than 10°, for example comprised between 0° and 6°) with respect to the equatorial plane M-M of the tyre 100.

The tread band 109 is applied in a radially outer position with respect to the zero degrees reinforcing layer 106c.

Respective sidewalls 108 made of elastomeric material are applied on the opposite side surfaces of the carcass structure 101, in an axially outer position with respect to the carcass structure 101 itself. Each sidewall 108 extends from one of the side edges of the tread band 109 up to the respective annular reinforcing structure 103.

The anti-abrasion strip 105, if provided, extends at least up to the respective sidewall 108.

In some specific embodiments, like the one shown and described herein, the stiffness of the sidewall 108 can be improved by providing a stiffening layer 120, generally known as "flipper" or additional strip-like insert, and which has the function of increasing the stiffness and integrity of the annular reinforcing structure 103 and of the sidewall 108.

The flipper 120 is wound around a respective bead core 102 and elastomeric filler 104 so as to at least partially wrap around the annular reinforcing structure 103. In particular, the flipper 120 wraps the annular reinforcing structure 103 along the axially inner, axially outer and radially inner areas of the annular reinforcing structure 103.

The flipper 120 is arranged between the turned end edge of the carcass ply 111 and the respective annular reinforcing structure 103. Usually, the flipper 120 is in contact with the carcass ply 111 and the annular reinforcing structure 103.

In some specific embodiments, like the one shown and described herein, the annular reinforcing structure 103 can also comprise a further stiffening layer 121 that is generally known by the term "chafer", or protective strip, and which has the function of increasing the stiffness and integrity of the annular reinforcing structure 103.

The chafer 121 is associated with a respective turned end edge of the carcass ply 111 in an axially outer position with respect to the respective annular reinforcing structure 103 and extends radially towards the sidewall 108 and the tread band 109.

The flipper 120 and the chafer 121 comprise reinforcing cords 10d* (in the attached figures those of the flipper 120 cannot be seen) coated with an elastomeric material or incorporated in a matrix of cross linked elastomeric material.

The tread band 109 has, in a radially outer position, a rolling surface 109a configured to come into contact with the ground. Channels and grooves (not shown in FIG. 1) are formed on the rolling surface 109a and define a tread pattern (not shown in FIG. 1) on the rolling surface 109a.

An under-layer 107 is arranged between said zero degrees reinforcing layer 106c and the tread band 109.

In some specific embodiments, like the one shown and described herein, a strip 110 consisting of elastomeric material, commonly known as "mini-sidewall", can optionally be provided in the rea connecting the sidewalls 108 and the tread band 109. The mini-sidewall 110 is generally obtained through co-extrusion with the tread band 109 and allow an improvement of the mechanical interaction between the tread band 109 and the sidewalls 108.

Preferably, an end portion of the sidewall 108 directly covers the side edge of the tread band 109.

In the case of tubeless tyres, a layer of elastomeric material 112, generally known as "liner", can also be provided in a radially inner position with respect to the carcass ply 111 to provide the necessary impermeability to inflation air of the tyre 100.

In the production cycle of the tyre 100 described above it is foreseen that, after a building process of a green tyre in which the various components of the tyre 100 are made and/or assembled, a molding and vulcanization process of the green tyre is carried out aimed at defining the structure of the tyre 100 according to a desired geometry, usually having the desired tread pattern.

The building of the green tyre can be carried out by assembling its respective semi-finished products on a forming support by at least one assembly device.

In particular, it is possible to assemble on the forming support an inner sleeve comprising the carcass structure 101 of the tyre 100, the annular reinforcing structures 103 and the sidewalls 108. More in particular, at first the forming support receives the possible liner 112. Subsequently, the carcass structure 101 is formed by depositing the at least one carcass ply 111 and forming the opposite annular reinforcing structures 103. Subsequently, the sidewalls 108 and the anti-abrasion strip 105 are positioned, if provided.

In an auxiliary forming support, it is possible to assemble an outer sleeve comprising the belt structure 106, the possible zero degrees reinforcing layer 106c and the tread band 109.

Subsequently, the aforementioned outer sleeve is arranged in a coaxially centered and radially outer position with respect to the aforementioned inner sleeve and the green tyre thus assembled is shaped according to a toroidal configuration through radial expansion of the inner sleeve, so as to associate the radially outer surface of the inner sleeve with the radially inner surface of the outer sleeve.

The green tyre so shaped is subsequently subjected to a molding and vulcanization process aimed at determining the structural stabilization of the tyre through cross linking of the elastomeric material as well as at printing the desired tread pattern on the tread band 109.

With reference to FIGS. 2 and 3, the tread band 109 is asymmetrical with respect to the equatorial plane M-M, i.e. the tread pattern at the portion of tread band 109 that is arranged on one side with respect to the equatorial plane M-M (for example to the left of the equatorial plane M-M in the embodiment shown in FIGS. 2 and 3) is not identical to and/or the mirror-like the portion of tread band 109 that is arranged on the other side with respect to the equatorial plane M-M (for example to the right of the equatorial plane M-M in the embodiment shown in FIGS. 2 and 3).

As shown in FIG. 2, the tread band 109 comprises an axially central annular portion A that extends on opposite sides with respect to the equatorial plane M-M, two annular shoulder portions S arranged on opposite sides with respect to the axially central annular portion A and two side annular portions B, each of which is axially interposed between the axially central annular portion A and a respective annular shoulder portion S.

The depth of the tread band 109 at the side annular portions B is greater than that at the annular shoulder portions S and lower than that at the axially central annular portion A.

In an embodiment, the depth of the tread band 109 is equal to 8.5 mm at the axially central annular portion A, equal to 8 mm at the side annular portions B and equal to 7.5 mm at the annular shoulder portions S.

With reference to FIGS. 2 and 3, the tread band 109 comprises three circumferential channels 10a, 10b, 10c. Such channels are parallel to one another and parallel to the equatorial plane M-M.

The circumferential channels 10a and 10b delimit on axially opposite sides a first annular portion 109a of tread band, whereas the channels 10b e 10c delimit on axially opposite sides a second annular portion 109b of tread band.

The first annular portion 109a extends asymmetrically on opposite sides with respect to the equatorial plane M-M and has a width preferably smaller than that of the axially central annular portion A.

The second annular portion 109b extends entirely on just one side with respect to the equatorial plane M-M (to the right of the equatorial plane M-M in the embodiment shown in FIGS. 2 and 3) and has a width smaller than that of the first annular portion 109a.

The width of the first annular portion 109a is such that the ratio between such a width and the maximum width of a radial section of the tyre 100 is greater than, or equal to, 0.30, for example equal to 0.33.

The width of the second annular portion 109b is such that the ratio between such a width and the maximum width of a radial section of the tyre 100 is greater than, or equal to, 0.15, for example equal to 0.17.

The tread band 109 also comprises two side annular portions 109c arranged on opposite sides with respect to the equatorial plane M-M.

One of said side annular portions 109c is axially interposed between the circumferential channel 10a and an annular shoulder portion S and is thus arranged in an axially outer position with respect to the circumferential channel 10a. The other of said side annular portions 109c is axially interposed between the circumferential channel 10c and the other annular shoulder portion S and is thus arranged in an axially outer position with respect to the circumferential channel 10c.

The tread band 109 comprises a plurality of sipes L in the first annular portion 109a, in the second annular portion

109b, and in the two side annular portions 109c. For the sake of simplicity, reference letter L is only indicated in FIG. 2 and only at one of said sipes.

In preferred embodiments, the tread band 109 comprises a number of pitches greater than, or equal to, 56, for example equal to 68.

In particular, as schematically shown in FIG. 2, three different types of pitches P1, P2, P3 are provided that differ from each other in that they have different circumferential lengths.

The pitches P1, P2 and P3 are suitably alternated in the tread pattern according to a predetermined sequence, for example obtained by a suitable software. FIG. 2 shown as an example a part of a possible sequence.

Again with reference to FIG. 2, the first annular portion 109a comprises, at the circumferential channel 10b, a chamfered side edge 109a′.

With reference to FIGS. 2 and 3, the first annular portion 109a comprises two annular grooves 50, 55 that extend circumferentially along respective zig-zag paths. Such grooves 50, 55 preferably have a depth comprised between 6 mm and 8 mm.

In the embodiment shown in FIGS. 2 and 3, the two annular grooves 50, 55 are identical to each other.

In particular, each of the annular grooves 50, 55 comprises a plurality of first parts 51, 56 of equal length. Such first parts 51, 56 are parallel to one another and inclined on one side with respect to a reference plane T orthogonal to the equatorial plane M-M. Such an angle is preferably greater than 45°, for example equal to 60°.

Each of the annular grooves 50, 55 also comprises a plurality of second parts 52, 57 of equal length. Each second part 52, 57 is circumferentially interposed between two first parts 51, 56 of the respective circumferentially consecutive annular groove 50, 55 and connects such first parts 51, 56.

The second parts 52, 57 are parallel to one another and inclined with respect to the reference plane T on the opposite side to the first parts 51, 56.

Each of the second parts 52, 57 has a length shorter than that of the first parts 51, 56 and is arranged orthogonal to the first parts 51, 56.

Each second part 52 of the annular groove 50 is aligned with a respective second part 57 of the annular groove 55 and is connected to the latter through a respective connecting groove 53.

The connecting grooves 53 thus connect together the two annular grooves 50, 55.

The first annular portion 109a comprises a circumferential row of blocks 70 of quadrangular, preferably square, shape.

As shown in FIGS. 2 and 3, such a circumferential row of blocks 70 is preferably arranged in an axially central position with respect to the annular grooves 50, 55.

Turning in the clockwise direction around each block 70 starting from a respective first part 51, such a block 70 is delimited by a first part 51, a second part 52, a connecting groove 53, a first part 56, a second part 57, another connecting groove 53.

Each block 70 shares a connecting groove 53 with the circumferentially adjacent block 70.

Each block 70 is connected to the circumferential channel 10a by a respective first transversal groove 60 arranged at an intermediate portion of the first part 51 and through a respective second transversal groove 80 arranged at an end of the first part 51, i.e. at the point in which the first part 51 joins to a second part 52.

Similarly, each block 70 is connected to the circumferential channel 10b by a respective first transversal groove 65 arranged at an intermediate portion of the first part 56 and through a respective second transversal groove 85 arranged at an end of the first part 56, i.e. at the point in which a second part 57 joins to a first part 56.

In this way, the annular groove 50 is connected to the circumferential channel 10*a* by a plurality of transversal grooves 60, 80 and the annular groove 55 is connected to the circumferential channel 10*b* by a plurality of transversal grooves 65, 85.

In the embodiment shown in FIGS. 2 and 3, each of the transversal grooves 60 extends along a trajectory defined by two mutually inclined segments and in particular: an initial segment 61 adjacent to the circumferential channel 10*a* and a final segment 62 adjacent to the annular groove 50. The initial segments 61 have a length substantially equal to that of the final segments 62. Alternatively, like in the embodiment shown in FIGS. 2 and 3, the initial segments 61 are slightly longer than the final segments 62. Such segments 61, 62 provide each transversal groove 60 with a V shape.

Similarly, each of the transversal grooves 65 extends along a trajectory defined by two mutually inclined segments and in particular: an initial segment 66 adjacent to the circumferential channel 10*b* and a final segment 67 adjacent to the annular groove 55. The initial segments 66 have a length substantially equal to that of the final segments 67. Alternatively, like in the embodiment shown in FIGS. 2 and 3, the initial segments 66 are slightly longer than the final segments 67. Such segments 66, 67 provide each transversal groove 65 with a V shape, with the vertex of such a V oriented along a circumferential direction opposite to that of the vertices of the V of the transversal grooves 60.

Each of the transversal grooves 80 extends along a trajectory defined by two mutually inclined segments and in particular: an initial segment 81 adjacent to the circumferential channel 10*a* and a final segment 82 adjacent to the annular groove 50. The initial segments 81 are longer than the final segments 82. Such segments 81, 82 provide each transversal groove 80 with a V shape, with the vertex of such a V oriented like the vertices of the V of the transversal grooves 60.

Similarly, each of the transversal grooves 85 extends along a trajectory defined by two mutually inclined segments and in particular: an initial segment 86 adjacent to the circumferential channel 10*b* and a final segment 87 adjacent to the annular groove 55. The initial segments 86 are longer than the final segments 87. Such segments 86, 87 provide each transversal groove 85 with a V shape, with the vertex of such a V oriented along a circumferential direction opposite to that of the vertices of the V of the transversal grooves 80.

The initial segments 61, 81 are parallel to one another.

The final segments 62, 82 are parallel to one another.

The initial segments 66, 86 are parallel to one another and parallel to the initial segments 61, 81.

The final segments 67, 87 are parallel to one another.

Each final segment 62 is aligned with a respective final segment 67.

Each final segment 82 is aligned with a respective second part 52, with a respective connecting groove 53, with a respective second part 57 and with a respective segment 87.

The points in which the segments 61 join to the segments 62, such points corresponding to the vertices of the V of the transversal grooves 60, are circumferentially aligned with the points in which the segments 81 join the segments 82, such points corresponding to the vertices of the V of the transversal grooves 80. All of the aforementioned points (or vertices) are aligned along a first direction parallel to the equatorial plane M-M.

Similarly, the points in which the segments 66 join to the segments 67, such points corresponding to the vertices of the V of the transversal grooves 65, are circumferentially aligned with the points in which the segments 86 join the segments 87, such points corresponding to the vertices of the V of the transversal grooves 85. All of the aforementioned points (or vertices) are aligned along a second direction parallel to the equatorial plane M-M.

The second annular portion 109*b* comprises a plurality of transversal grooves 90 that are parallel to each other. Such transversal grooves 90 define, with the circumferential channels 10*b*, 10*c*, a circumferential row of blocks 88 of quadrangular, preferably square, shape.

Each of the opposite side annular portions 109*c* comprises a plurality of transversal grooves 95 that are parallel to each other.

The transversal grooves 95 of one of the side annular portions 109*c* define, with the circumferential channel 10*a*, a circumferential row of blocks 98 that extend from the circumferential channel 10*a* up to the annular shoulder portion S adjacent thereto, whereas the transversal grooves 95 of the other of the side annular portions 109*c* define, with the circumferential channel 10*c*, a circumferential row of blocks 99 that extend from the circumferential channel 10*c* up to the annular shoulder portion S adjacent thereto.

Due to the provision of the aforementioned circumferential channels 10*a*, 10*b*, 10*c* and of all of the annular and transversal grooves described above, the tread band 109 has a void to solid ratio lower than or equal to 0.30, for example equal to 0.26.

COMPARATIVE TESTS

The Applicant made some tyres of size 205/55 R16 in accordance with the present invention. Such tyres are indicated hereinafter with INV.

Such tyres had structure and dimensions identical to those of a tyre of the Applicant appreciated by customers for its excellent behavior on low-grip road surfaces, in particular on icy and possibly snow-covered road surfaces. Such a tyre hereinafter is indicated with Ref.

The tyres INV thus differed from the tyres Ref. only for their different tread pattern.

Indoor comparison tests were carried out between the tyres INV and the tyres Ref.

The tests were carried out by mounting the aforementioned tyres, inflated with the same inflation pressure on the same kind of wheels, on the wheels of a same vehicle in substantially identical environmental conditions.

The behavior of the tyres INV and Ref. was evaluated, asking a judgement to the driver. In particular, the items listed in table 1 below were evaluated, where the qualitative judgement expressed by the driver is also given.

In table 1, "=" indicates the positive judgement obtained by the tyres Ref. and "+" indicates an improvement with respect to the tyres Ref.

TABLE 1

|  | Ref. | INV. |
|---|---|---|
| Braking on ice | = | = |
| Traction on ice | = | + |
| Braking on snow | = | = |

TABLE 1-continued

|  | Ref. | INV. |
| --- | --- | --- |
| Traction on snow | = | + |
| Braking in the dry | = | = |
| Braking in the wet | = | + |

Table 1 shows that the tyres INV offered improved performance with respect to that of the tyres Ref., in particular with respect to traction on icy or snow-covered road surfaces and to braking on wet road surfaces, having substantially identical behavior to that of the tyres Ref. with respect to braking on icy or snow-covered road surfaces and braking on dry road surfaces. The Applicant has thus had confirmation of the fact that the particular tread pattern adopted in the tyres of the invention effectively makes it possible to obtain the desired improvement of performance on low-grip road surfaces.

The excellent behavior of the tyre of the invention on low-grip road surfaces is also confirmed by the shape of its footprint, shown in FIG. 4. Such a footprint is obtained in particular by subjecting the tyres INV to a vertical load of 450 Kg. It can be seen that the footprint has a substantially elliptical shape with a very even perimeter edge. This confirms that the contact surface with the road surface is maximized, as desired for tyres intended to be used on low-grip road surfaces. The substantial uniformity of the white-black contrast over the whole footprint also demonstrates an even and uniform distribution of the contact pressures inside the footprint, this feature being also desired in tyres intended for use on low-grip road surfaces.

The Applicant has also carried out some indoor comparative tests to measure the rolling noise. Such tests were carried out in accordance with what is prescribed in UNECE reg.117 (Rev. 4, 2016 Annex 3) and ISO 13325:2019-Annex A (Vehicle Method).

A value of 69 db was measured with the tyres Ref. and a value of 68.6 db was measured with the tyres INV, confirming the excellent behavior of the tyres of the invention also with respect to the rolling noise.

Of course, those skilled in the art can bring further modifications and variants to the tyre of the present invention described above in order to satisfy specific and contingent application requirements, these variants and modifications in any case being covered by the scope of protection as defined by the following claims.

The invention claimed is:

1. A tyre for vehicle wheels, comprising
a tread band having a first annular portion delimited by two circumferential channels, the first annular portion comprising two annular grooves extending along respective zig-zag paths, each of said two annular grooves comprising:
first parts inclined on one side with respect to a reference plane orthogonal to an equatorial plane of said tyre, and
second parts inclined with respect to said reference plane on an opposite side to said first parts, each of said second parts being circumferentially interposed between two respective first parts,
wherein each of said first parts is connected to a respective circumferential channel of said two circumferential channels by a respective first transversal groove arranged at an intermediate portion of the first part and by a respective second transversal groove arranged at an end of the first part, wherein the second parts of one of said two annular grooves are connected to respective second parts of an other of said two annular grooves by respective connecting grooves, and
wherein no transversal grooves are arranged between two circumferentially consecutive connecting grooves.

2. The tyre according to claim 1, wherein said first parts are longer than said second parts.

3. The tyre according to claim 1, wherein within a single pitch of the tread band
the first parts of each of said two annular grooves are parallel to each other and have a first equal length, and
the second parts of each of said two annular grooves are parallel to each other and have a second equal length.

4. The tyre according to claim 3, wherein
the first parts of a first annular groove of said two annular grooves are parallel to the first parts of a second annular groove of said two annular grooves and
the second parts of said first annular groove are parallel to the second parts of said second annular groove.

5. The tyre according to claim 1, wherein each second part of the first annular groove of said two annular grooves is aligned with a respective second part of the second annular groove of said two annular grooves.

6. The tyre according to claim 1, wherein the first parts of each of said two annular grooves are orthogonal to the second parts of a respective annular groove.

7. The tyre according to claim 1, wherein said first annular portion comprises, between said two annular grooves, a circumferential row of blocks having a quadrangular shape.

8. The tyre according to claim 7, wherein each block of said circumferential row of blocks has a square shape.

9. The tyre according to claim 7, wherein said circumferential row of blocks is in an axially central position with respect to said two annular grooves.

10. The tyre according to claim 7, wherein each block of said circumferential row of blocks is delimited by:
a first part of the first parts of a first annular groove of said two annular grooves,
a second part of the second parts of said first annular groove,
a first connecting groove,
a first part of the first parts of a second annular groove of said two annular grooves,
a second part of the second parts of said second annular groove, and
a second connecting groove.

11. The tyre according to claim 1, wherein each of said first transversal groove and second transversal groove comprises two mutually inclined segments.

12. The tyre according to claim 1, wherein said first annular portion comprises, at at least one of said two circumferential channels, a chamfered side edge.

13. The tyre according to claim 1, wherein said first annular portion is asymmetrical with respect to the equatorial plane.

14. The tyre according to claim 1, wherein the tread band is asymmetrical with respect to the equatorial plane.

15. The tyre according to claim 1, wherein a ratio between a width of said first annular portion and a maximum width of a radial section of the tyre is greater than or equal to 0.30.

16. The tyre according to claim 1, wherein the tread band has a void to solid ratio less than or equal to 0.30.

17. The tyre according to claim 1, wherein the tread band comprises a number of pitches greater than or equal to 56.

18. The tyre according to claim 1, wherein the tread band has a tread pattern comprising a plurality of first pitches having a first circumferential length, a plurality of second pitches having a second circumferential length different from said first circumferential length, and a plurality of third pitches having a third circumferential length different from said first circumferential length and said second circumferential length.

19. The tyre according to claim 1, wherein the tread band comprises a second annular portion delimited by a circumferential channel of said two circumferential channels and a third circumferential channel.

20. The tyre according to claim 19, wherein said second annular portion comprises a plurality of transversal grooves parallel to each other.

21. The tyre according to claim 19, wherein said second annular portion comprises a circumferential row of blocks having a quadrangular shape.

22. The tyre according to claim 20, wherein a ratio between a width of said second annular portion and the maximum width of the radial section of the tyre is greater than or equal to 0.15.

23. The tyre according to claim 1, wherein the tread band has, at opposing annular shoulder portions thereof, a depth smaller than a depth at an axially central annular portion extending on opposite sides with respect to the equatorial plane.

24. The tyre according to claim 1, wherein the tread band comprises a plurality of sipes.

25. A tyre for vehicle wheels, comprising a tread band having a first annular portion delimited by two circumferential channels, the first annular portion comprising two annular grooves extending along respective zig-zag paths, each of said two annular grooves comprising:

first parts inclined on one side with respect to a reference plane orthogonal to an equatorial plane of said tyre, and second parts inclined with respect to said reference plane on an opposite side to said first parts, each of said second parts being circumferentially interposed between two respective first parts, wherein each of said first parts is connected to a respective circumferential channel of said two circumferential channels by a respective first transversal groove arranged at an intermediate portion of the first part and by a respective second transversal groove arranged at an end of the first part, wherein said first annular portion comprises, between said two annular grooves, a circumferential row of blocks having a quadrangular shape, and wherein each block of said circumferential row of blocks has a square shape.

26. A tyre for vehicle wheels, comprising a tread band having a first annular portion delimited by two circumferential channels, the first annular portion comprising two annular grooves extending along respective zig-zag paths, each of said two annular grooves comprising:

first parts inclined on one side with respect to a reference plane orthogonal to an equatorial plane of said tyre, second parts inclined with respect to said reference plane on an opposite side to said first parts, each of said second parts being circumferentially interposed between two respective first parts, wherein each of said first parts is connected to a respective circumferential channel of said two circumferential channels by a respective first transversal groove arranged at an intermediate portion of the first part and by a respective second transversal groove arranged at an end of the first part, wherein said first annular portion comprises, between said two annular grooves, a circumferential row of blocks having a quadrangular shape, and wherein each block of said circumferential row of blocks is delimited by:

a first part of the first parts of a first annular groove of said two annular grooves, a second part of the second parts of said first annular groove, a first connecting groove, a first part of the first parts of a second annular groove of said two annular grooves, a second part of the second parts of said second annular groove, and a second connecting groove.

* * * * *